Oct. 30, 1945.  F. R. HARRIS  2,387,844
SHOCK PREVENTING FLOATING DRY DOCK
Filed July 6, 1943  3 Sheets-Sheet 1

INVENTOR.
Frederic R. Harris
BY William F. Nickel
ATTORNEY

Oct. 30, 1945.   F. R. HARRIS   2,387,844
SHOCK PREVENTING FLOATING DRY DOCK
Filed July 6, 1943   3 Sheets-Sheet 2
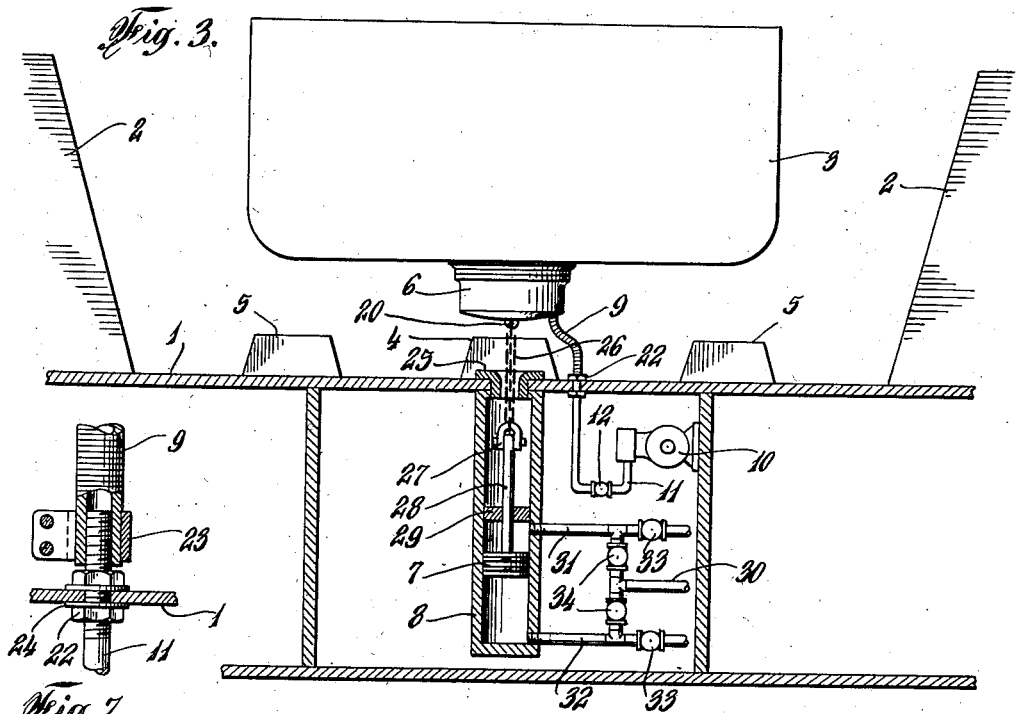
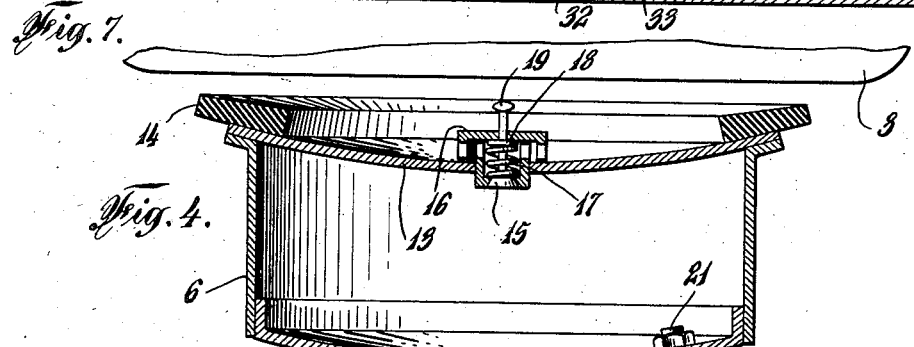
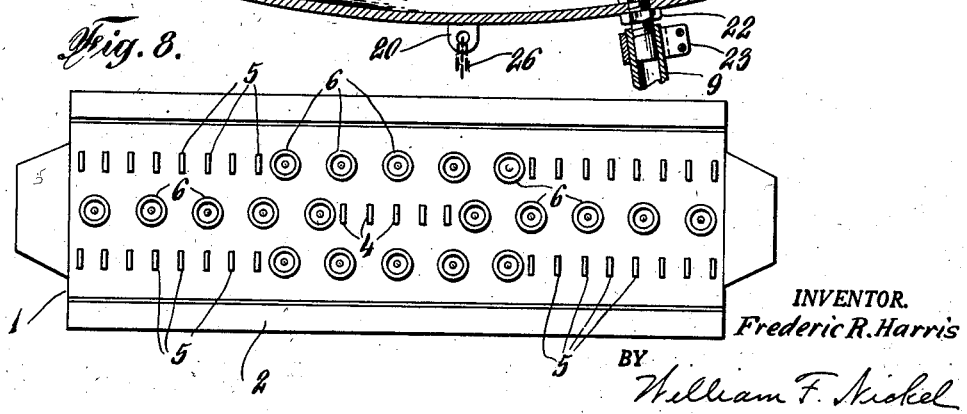
INVENTOR.
Frederic R. Harris
BY
William F. Nickel
ATTORNEY

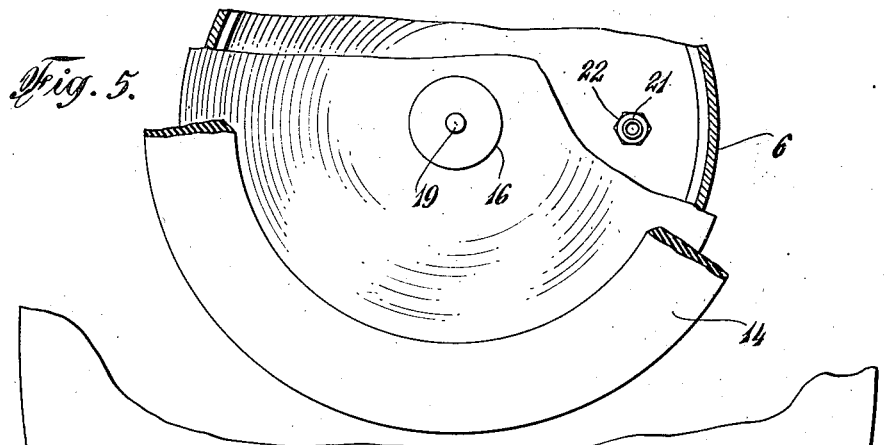
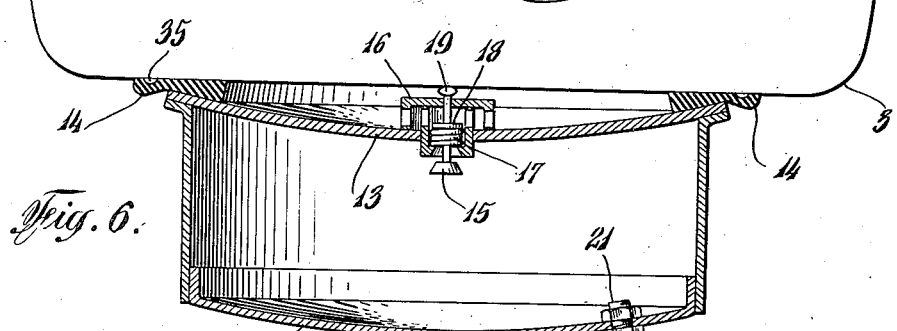
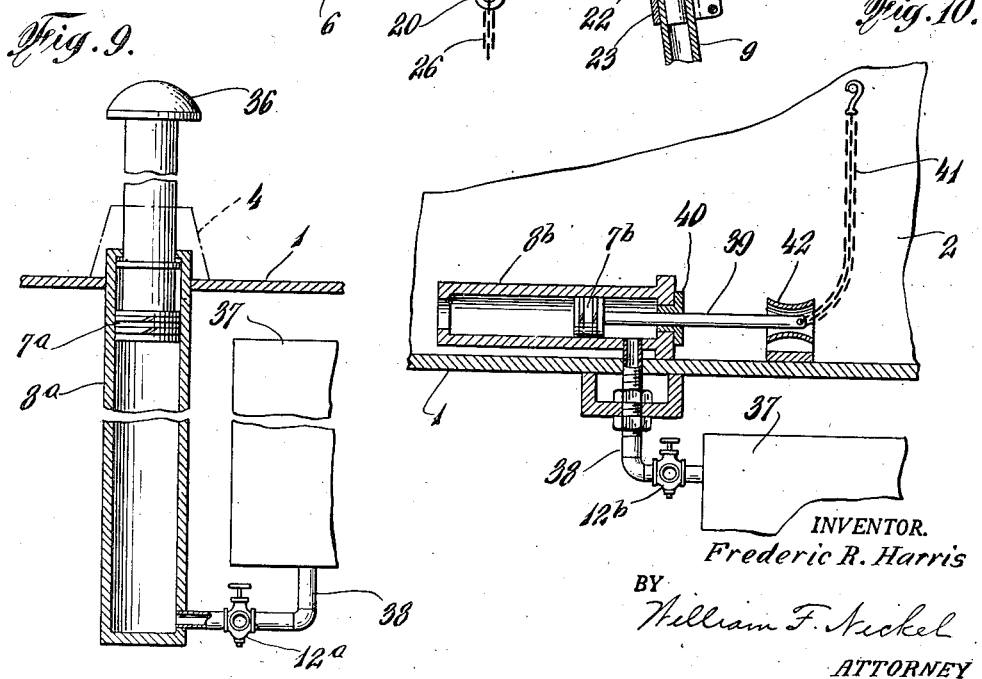

Patented Oct. 30, 1945

2,387,844

UNITED STATES PATENT OFFICE 2,387,844

SHOCK PREVENTING FLOATING DRY DOCK

Frederic R. Harris, New York, N. Y.

Application July 6, 1943, Serial No. 493,677

15 Claims. (Cl. 114—45)

This invention relates to improvements in dry docks, especially floating docks which can be moved about and operated off-shore to lift and repair ships.

In my co-pending application for patent on improvements in dry docks Serial Number 487,735, filed on May 20, 1943, I have set forth the difficulties in the way of using floating dry docks in open water or similar locations where the dock is exposed to the action of waves or ground swells; and the attendant risk of damage, which is liable to ensue from collisions arising from the pitching and rolling of the dock and the ship. I have also described therein how the utility of that type of dock at such places can be increased, and the safety of the dock and ship assured, by mounting on the floor of the dock a number of shock absorbers by which any impact of the dock against the bottom of the vessel therein is cushioned and made harmless.

The present invention comprises in particular novel means for actually mooring the dock to the ship, after the vessel is floated into the dock and before the latter is lifted, in a manner that will prevent or suppress motion of the ship; except in unison with the heaving of the dock itself. All danger of the two masses coming into violent contact is thus completely eliminated.

In its preferred form the invention comprises means attached to the dock for engaging the hull of a vessel therein at a number of points; and apparatus for drawing said means taut as the ship settles on the keel and bilge blocks, when the dock is raised. Thus, no part of the ship can be moved in the dock by wave action or by the surging or dropping of the dock at any given point; but all sections of the bottom of the ship are held at equal height above the floor of the dock until there is no longer enough water beneath the keel of the ship to have any troublesome effect.

The drawings illustrate one or more ways in which the invention may be practiced; but I, of course, do not wish to be limited to any specific details of structure or steps of procedure; since many variations may be followed without departing from the principle herein set forth.

On said drawings:

Figure 3 is a similar view of the next stage.

Figure 4 is a sectional view on an enlarged scale of one of the engaging units attached to the ship's hull on the bottom.

Figure 5 is a top plan, partly in section, of such a unit.

Figure 6 is a view similar to Figure 5 showing said unit firmly attached to a ship.

Figure 7 shows a detail of the construction.

Figure 8 is a top plan of a floating dock showing the arrangement of said units on the deck or floor thereof, and Figures 9 and 10 are illustrations in section of two additional means for practicing the invention.

The same numerals identify the same parts throughout.

Figure 1:
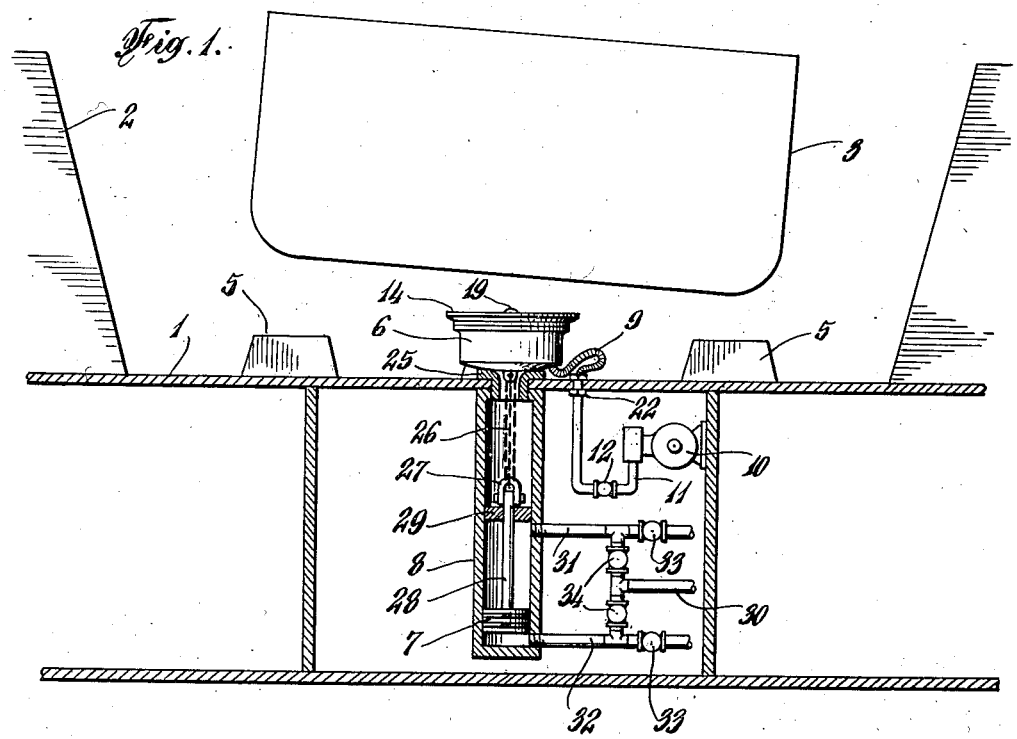
Figure 1 is a view in cross-section showing part of a floating dry dock receiving a ship, and having apparatus installed according to my invention.

Referring first to Figure 8, I employ the numeral 1 to indicate the pontoon body of a floating dry dock having wing walls 2 along its sides, but open at the two ends; giving the dock the conventional U-shaped cross section. The ship 3 is floated in through one of the open ends, as the dock is submerged; and lies between the walls 2, as presented in Figures 1, 2 and 3. The dock has two rows of bilge blocks 5 along the sides and a central row of keel blocks 4. In line with these blocks are the attaching units 6, in such numbers as are needed. I have shown five such units on each side at the middle, and five along the center line near each end; but this arrangement can of course be altered.

Each unit 6, in this form of the invention, is adapted to be attached to the bottom of the hull of a ship; and held there forcibly by sufficient pressure, at each point of engagement, to be pulled strongly downward. It works on the principle of the vacuum cup, and has the shape of a large cylindrical tank or drum with a concave top. Beneath the units 6, inside the pontoon body or hull 1, are pistons 7 in power chambers 8; designed to be operated by a pressure fluid medium, such as compressed air, to pull the units 6 downward. The tanks 6 have flexible conduits 9, through which they are evacuated by exhaust pumps indicated at 10, at suitable places within the pontoon hull 1. The conduits 9 are united to pipes 11 in the hull extending to the pumps 10, and in the pipes 11 are hand valves 12 to shut the pipes when necessary. Of course, a single pump 10 with branch pipes 11 to the various units can be installed if desired.

The tanks 6 are wide but relatively shallow. Their concave tops 13 have gaskets 14, of rubber or other suitable material around the rims thereof.

In the center of the tops are one-way inlet valves 15, in suitable open fittings or cages 16. These cages contain springs 17 surrounding the valve stems, and seating against collars 18 on the stems and inside shoulders at the inner ends of the cages to hold the valves shut. The stems project a little beyond the level of the planes of the gaskets 14 and terminate in the outer heads 19.

Figure 2:
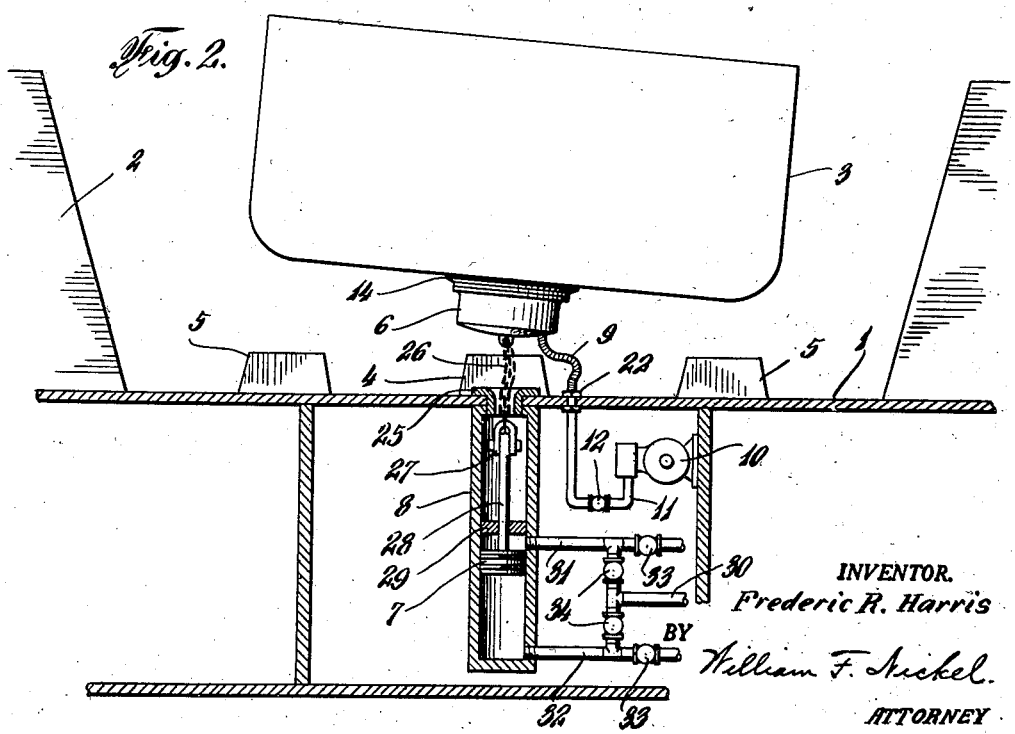
Figure 2 shows such apparatus in the first stage of engaging the hull of the ship.

In action, when the dock is sunk and a ship moves in, the pumps 10 are started and the units 6 are floated up to the ship's bottom. Being voided of air they press with great force against the vessel. As soon as the heads 19 make contact with the ship, the valves 15 open because the heads 19 are pushed down and all water trapped in the spaces surrounded by the gaskets 14 on the tops 13 drains into the tanks and is drawn out in the form of vapor by the pumps 10. The tanks thus fasten themselves tightly to the vessel as the dock is pumped out and raised, and the water depth under the ship's bottom diminishes. Each tank 6 is connected to the piston 7 under it by a flexible chain or cable 26. These chains are kept taut by compressed air admitted to the chambers 8 above the pistons, and the tanks are pulled down as the ship settles evenly on the blocks 4 and 5 as depicted in Figure 3. Obviously, if the ship is rolling from side to side, as indicated in Figures 1 and 2, the tanks which engage the higher side will pull that side down and the tanks along the lower side will prevent that side from rising too much. Also the units on the center line near the two ends will act in the same way to suppress pitching. Only the units in line with the blocks 4 are shown in Figures 1, 2 and 3, but the action will be clear. All motion of the ship in dock, except in unison with the latter as it may be rocked by waves is prevented and danger of collision is entirely removed.

The utility of the invention will now be perceived. As my aforesaid application sets forth, a floating dry dock of the usual design can be utilized only in a sheltered bay or harbor where the surface of the water has little or no vertical movement. If exposed to the action of waves or swells, such a floating dock will naturally pitch or roll; and anything like safe operation will be impossible. Whenever, under such conditions, an attempt is made to raise a ship with the dock, the two structures swing independently, up and down out of synchronism and out of phase. The ship and the dock will therefore come together repeatedly and with great violence; and heavy damage can be sustained. If a ship of large size is put into an ordinary floating dock in a ground swell of, say, six feet from crest to trough, whole sections of the ship's bottom may be crushed in, much of the strength of the hull destroyed and great additional damage wrought upon the dock itself, before the vessel could be settled firmly upon the keel blocks. This result is due to the fact that the dock, when submerged, cannot be pumped out and made to rise in the water and lift the vessel rapidly enough to prevent such disastrous collisions.

Naturally, a floating dock is always stationed at a site where no wave action prevails, if such a site is available. But in such a locality there is seldom enough water for submersion of the dock. The depth required for large vessels is sometimes 70 to 80 feet; and in a well-protected harbor a stretch of water having such a depth can hardly ever be found. Hence, if a basin for the dock in a harbor is necessary, it must generally be excavated by dredging, with the expenditure of much time and money. A great advantage is therefore gained if floating dry docks can be operated in open waters, where sufficient depth is offered, in spite of the difficulties that wave action entails.

With this invention vessels of the maximum size can be taken by a floating dry dock and serviced in open waters, such as roadsteads and similar areas, where ground swells and waves are always encountered. The vessel will settle very easily. If there is a sea or ground swell running, so that the vessel rolls or pitches, the plural attaching units anchor the vessel very effectively and prevent damage. In rolling or pitching, any part of the ship will require from five to ten seconds to complete its movement; sometimes as much as fifteen seconds. With waves running, say, six feet or eight feet high, in the neighborhood of the dock, the ship in the dock will probably not move vertically more than three feet or four feet. The kinetic energy of the hull of a large vessel having this kind of motion, even though the rate is low, will be very great because such energy is always proportional to the square of the velocity. Such energy, however, is completely neutralized in the manner above described. As soon as the vacuum tanks are caused to attach themselves to the hull of the ship, the compressed air in the cylinders 8 exerts enough force on the chains and pistons to pull the hull deeper into the water. Such action imparts excess buoyancy to the ship, and this results in a lifting force which is exerted upon the dock and causes it to act as additional ballast to steady the ship. Both ship and dock thus become a single, stable system, with virtually all independent relative up and down movement of the two chief members suppressed. The vacuum tanks can easily be so designed that the full effect of ordinary waves running six to eight feet high, can be completely eliminated and a ship can be safely lifted and repaired in the open seaway. Actual tests have proved this.

The cylinders or power chambers 8 are preferably secured to the underside of the dock floor in vertical positions; so that the pistons 7 move up and down to control the tanks 6. The flexible conduits 9 may be armored hose united to outlet nipples 21 affixed in the bottoms of the tanks 6 by clamp nuts 22, with clamps 23 to affix the conduits 9 to the outer ends of the nipples. The conduits 9 are similarly united to the outer ends of the pipes 11, which are mounted in the dock floor by similar nuts 22 and washers 24. Instead of hose, pipe with loose-coupled joints may be adopted.

An eyelet or ring 20 at the lower end of each tank holds one end of the chain 26. The other is joined to a staple 27 bolted to one end of piston rod 28. A bushing 25 in the dock floor, with a large central opening gives passage to the chain 26 and in each cylinder is a piston rod guide 29. The cylinders are long, and the rods 28 do not ever project out of them. Water may enter and leave the upper halves of the cylinders through the bushings 25.

The compressed air for the chambers comes from a reservoir, not shown, through a pipe line 30 with branches 31 and 32 leading to points above and below the range of movement of the piston 7. Each branch has an air release valve 33 to discharge the air into the atmosphere; and a separate valve 34 to open and close communication between it and the supply pipe 30. To hold the tanks 6 down on the floor of the dock (Figure 1), the upper valve 33 and lower valve 34 are closed, the other two being opened. When the tanks are to be allowed to float up as far as their connections will let them go (Figure 2), the upper valve 33 and lower valve 34 are opened, and the others shut. Air will now exhaust from above the piston and compressed air enter the cylinder 8 below it. As the tank is evacuated it will be pushed against the vessel's hull so hard that the gasket 14 will be flattened and barnacles or other growths on the hull crushed or enveloped and embedded as indicated in Figure 6 at 35.

In Figure 9, a vertical cylinder 8a is shown fixed in place with its top projecting through the floor of the pontoon hull 1, and containing a plunger 7a. This plunger has a rod that projects out of the cylinder, which has an inner flange at its upper end to stop the plunger at the upper end of its movement. At its top the plunger bears a cushioned head 36. A compressed air reservoir 37 is connected to the bottom of the cylinder by means of a pipe 38 having a two-way valve 12a therein. The reservoir pressure is, say, 150 lbs. The cylinder will be relatively small, and when the plunger is pushed up it will constitute a shock absorber. These cylinders will be spaced about on the dock floor in the same way. If the ship rocks as it settles the cushioned heads will gradually steady it without damage to the ship. Afterwards the valve 12a can be turned to cut off the reservoir 37, and void the cylinder 8a.

In the modification of Figure 10, a horizontal cylinder 8b is affixed to the top of the pontoon deck and the piston therein has a rod 39 projecting through a packing gland 40 in one end. At the other end the cylinder is preferably open, to expose the piston to water pressure when the dock is sunk. In the pipe 38 connecting the space between the piston and the gland 40 to the air reservoir is a two-way valve 12b which in one position, exhausts the cylinder 8b, but not the reservoir 37, to the atmosphere. The outer end of the piston is connected to a chain 41; and affixed to the floor of the dock in proper position is a flaring tubular guide 42. As many of these units are provided as are necessary. When a ship is in the dock, the chains are first fastened to the ship at various points at or adjacent the level of the main deck thereof. At this time the valve 12b is in exhaust position as regards the cylinder; opening this cylinder to the air, but keeping the reservoir 37 closed; and as the dock is next submerged, water entering the open end forces the piston towards the end carrying the gland 40. The upper ends of the chains can then be fastened to the ship at any convenient places. The valve 12b is then turned to admit air from the reservoir 37. The pistons 7b are then retracted to make the chains taut. The ship in the dock is thus securely anchored as before. As the dock is raised no slackening of the chains takes place because the retraction of the pistons continues. Any heaving of the ship out of step with the dock is gradually eliminated, and the ship is settled as before in complete safety on the keel and bilge blocks. At other times when no ship is in the dock, or till after one enters, the chains can be hung by hooks on their outer ends to wooden pegs on the side walls 2. These pegs may be inserted into sockets, so that they can easily be pulled out if the air under pressure is admitted at the wrong moment into the power chambers 8b.

Thus, in actual practice, the mooring devices may have the form of either the tanks 6 or the chains 41, or other means of arresting and controlling the heaving of the ship when the dock receives it.

The cylinders 8b may of course be mounted on the ship and the chains 41 attached to the dock instead. Also, water or any other fluid medium may be utilized in place of air in the cylinders 8, 8a or 8b. I may, if necessary, locate the cylinders 8 on or in the side walls 2, and run the chains 26 over fixed pulleys to the points where the floats 6 must be kept to engage the bottom of the ship.

Having described my invention, what I believe to be new and desire to protect by Letters Patent of the United States is:

1. The method of operating a floating dry dock to expose a vessel therein which consists in submerging the dock, shifting a vessel into same, establishing connections between the vessel and the dock, applying force to said connections to pull the vessel downward in the dock and then raising the dock.

2. The method of operating a floating dry dock having a floor to expose a vessel therein which consists in submerging the dock, shifting a vessel into same, anchoring the vessel securely at a number of points to the floor of the dock to prevent rolling or pitching of said vessel, applying a downward acting force to said vessel at said points and then raising the dock.

3. The method of operating a floating dry dock having mooring devices to expose a vessel therein, which consists in submerging the dock, shifting a vessel into the latter, attaching said mooring devices to the vessel's hull, exerting a downward acting tension on said devices to tauten same and depress said hull, and then raising the dock.

4. The method of operating a floating dry dock having mooring devices to expose a vessel therein, which consists in submerging the dock, shifting a vessel into the latter, attaching said mooring devices to the vessel's bottom, exerting a downward acting tension on said devices to tauten same and depress the vessel, and then raising the dock.

5. The method of operating a floating dry dock having mooring devices to expose a vesesl therein, which consists in submerging the dock, shifting a vessel into same, attaching said mooring devices to the vessel above the bottom thereof, exerting a downward acting tension on said devices from the dock to tauten the latter and depress the vessel, and then raising said dock.

6. A dry dock comprising a hull having vacuum tanks therein with rims to engage a vessel in said dock, means in the dock for evacuating said tanks so that they adhere to the vessel, and means for anchoring the tanks to the dock.

7. A dry dock comprising a hull having vacuum tanks therein with closed tops, and rims around the tops to engage a vessel in the dock, inward opening valves in the tops with projecting stems to enable the valves to be forced open by the vessel, means for evacuating the tanks so that they adhere to the vessel, and means for anchoring the tanks to the dock.

8. The dry dock according to claim 6 wherein the anchoring means comprises cylinders, pistons therein connected to said tanks and means for supplying a fluid pressure medium to operate said pistons to pull the tanks downward.

9. The dry dock according to claim 7 wherein the anchoring means comprises cylinders carried by the dock, pistons therein connected to the tanks, and means for supplying a fluid pressure medium to pull the tanks downward.

10. A dry dock comprising a hull having a plurality of cylinders, pistons therein, having projecting rods, chains connected to said rods for attachment to a ship in the dock, and means for supplying pressure fluid to the cylinders to operate the pistons.

11. The dry dock according to claim 10 wherein hollow guides are mounted adjacent the cylinders on the pontoon deck of the dock for said chains.

12. In a dry dock a hull, tanks carried thereby, each tank having a concave top, a circular gasket attached to the rim thereof, a valve in top opening inward of the tank, the valve having a stem projecting above said rim and an exhaust connection for the tank.

13. A dry dock having a pontoon deck, a vertical cylinder in the dock having its upper end adjacent the deck, a piston in the cylinder, a vacuum tank above the deck, a flexible connection between the tank and the piston and means for supplying and controlling pressure fluid to operate the piston.

14. A dry dock having a hull, vacuum tanks carried thereby, each having a connection therefor to anchor it to the dock, means for evacuating said tanks, and a flexible connection through which the tanks communicate with said means.

15. A dry dock having a pontoon deck, a vertical power chamber below same but open to the outer face of the deck, a plunger in said chamber, a source of fluid pressure medium connected to the cylinder to control the plunger, and means for connecting to the plunger to engage a ship and suppress motion thereof independent of the motion of the dock.

FREDERIC R. HARRIS.